United States Patent [19]
Andress

[11] Patent Number: 5,839,961
[45] Date of Patent: Nov. 24, 1998

[54] BEARING ARRANGEMENT FOR A DRIVE SHAFT

[75] Inventor: Bernd Andress, Erdmannhausen, Germany

[73] Assignee: Andreas Stihl, Waiblingen, Germany

[21] Appl. No.: 873,639

[22] Filed: Jun. 12, 1997

[30] Foreign Application Priority Data

Jun. 15, 1996 [DE] Germany .......................... 196 23 921.4

[51] Int. Cl.⁶ ........................................................ F16C 1/06
[52] U.S. Cl. ............................ 464/52; 464/178; 464/180; 464/183; 56/12.6; 30/276
[58] Field of Search ................................... 30/276, 296.1; 464/170, 178, 180, 181, 183, 52, 81; 56/12.6, DIG. 6, DIG. 14

[56] References Cited

U.S. PATENT DOCUMENTS

| | | | |
|---|---|---|---|
| 4,848,846 | 7/1989 | Yamada et al. | 30/276 |
| 4,953,294 | 9/1990 | Dohse | 30/276 |
| 5,027,873 | 7/1991 | Anselm | 144/224 |
| 5,175,932 | 1/1993 | Lange et al. | 30/276 |
| 5,695,404 | 12/1997 | Shaulis | 464/52 |

FOREIGN PATENT DOCUMENTS 0023183  1/1981  European Pat. Off. .

Primary Examiner—Eugenia Jones
Assistant Examiner—Kevin G. Vereene
Attorney, Agent, or Firm—Walter Ottesen

[57] ABSTRACT

The invention is directed to a bearing arrangement for a drive shaft connecting a work tool to a drive unit. A protective tube has an inner wall surface and is part of this bearing arrangement. A bearing structure is mounted in the protective tube and has a bearing sleeve for accommodating the drive shaft therein. A plurality of longitudinally running supporting ribs extend from the bearing sleeve to act on the inner wall surface to hold the bearing sleeve approximately centered in the protective tube. Each of the supporting ribs includes a radial leg extending approximately radially from the bearing sleeve and a peripheral leg extending axially of the radial leg and approximately in the peripheral direction of the inner wall surface. The radial leg has an outer radial end portion facing toward the inner wall surface so as to leave a gap therebetween. The peripheral leg extends from the radial leg at the outer radial end portion and is supported on the inner wall surface. The peripheral leg is joined to the radial leg at an angle of less than 90°.

18 Claims, 4 Drawing Sheets

BEARING ARRANGEMENT FOR A DRIVE SHAFT

FIELD OF THE INVENTION

The invention relates to a bearing arrangement for a drive shaft mounted in a protective tube.

BACKGROUND OF THE INVENTION

A bearing of the kind referred to above is disclosed in U.S. Pat. No. 4,953,294 which is incorporated herein by reference. The bearing centers the drive shaft in the guide tube of a brushcutter and, at the same time, forms a bearing for the drive shaft. Elasticity is achieved because of the peripheral leg which extends, in part, in the peripheral direction. With this elasticity, oscillations and vibrations excited by the drive shaft are decoupled from the protective tube. The achieved elastic support of the bearing can, however, cause a shift from the center, for example, in bent protective tubes because of the cross section becoming oval in the bending region. This causes additional oscillations to be excited in unfavorable operating conditions. In practice, oscillations have been observed even in straight tubes. Because of the occurrence of resonance and the increasing amplitude associated therewith, a disadvantageous shift of the bearing sleeve from the center of the straight tube or bent tube can occur.

SUMMARY OF THE INVENTION

It is an object of the invention to improve the above-mentioned bearing arrangement in such a manner that a natural vibration of the bearing and a displacement of the bearing sleeve from the center are reliably avoided while at the same time maintaining easy assembly and excellent damping.

The invention is for a bearing arrangement for a drive shaft connecting a work tool to a drive unit. The bearing arrangement includes: a protective tube defining a longitudinal axis and having an inner wall surface extending in a peripheral direction about the longitudinal axis; a bearing structure mounted in the protective tube and having a bearing sleeve for accommodating the drive shaft therein and the bearing sleeve having an outer periphery; the bearing structure further including a plurality of longitudinally running supporting ribs extending from the outer periphery to act on the inner wall surface to hold the bearing sleeve approximately centered in the protective tube; each of the supporting ribs including a radial leg extending approximately radially from the bearing sleeve and a peripheral leg extending axially of the radial leg and approximately in the peripheral direction; the radial leg having an outer radial end portion facing toward the inner wall surface so as to leave a gap (a) therebetween; the peripheral leg extending from the radial leg at the outer radial end portion and being supported on the inner wall surface; and, the peripheral leg being joined to the radial leg at an angle of less than 90°.

The radial legs end at a narrow spacing to the interior periphery (inner wall surface) of the protective tube whereby the possibility of a displacement of the bearing sleeve out of the center is limited. The peripheral leg is connected to the free end of the radial leg. The peripheral leg extends in the peripheral direction and lies (depending upon the configuration) with the shorter or longer lever arm on the inner periphery of the protective tube so as to be supported thereagainst. The desired damping is achieved with the configuration of the lever arm without exceeding the maximum permissible shift of the bearing sleeve out of the center.

Preferably, a tail segment extends from the peripheral leg and projects beyond the connecting end of the radial leg. The tail segment extends in the axial direction of the radial leg and, together with a connecting segment of the peripheral leg, conjointly defines the head of the radial leg. For a contact of the radial leg after overcoming the spacing to the inner periphery of the protective tube, the head formed in this manner ensures a large surface contact so that especially larger displacement forces can be transmitted away via a large area into the wall of the protective tube.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
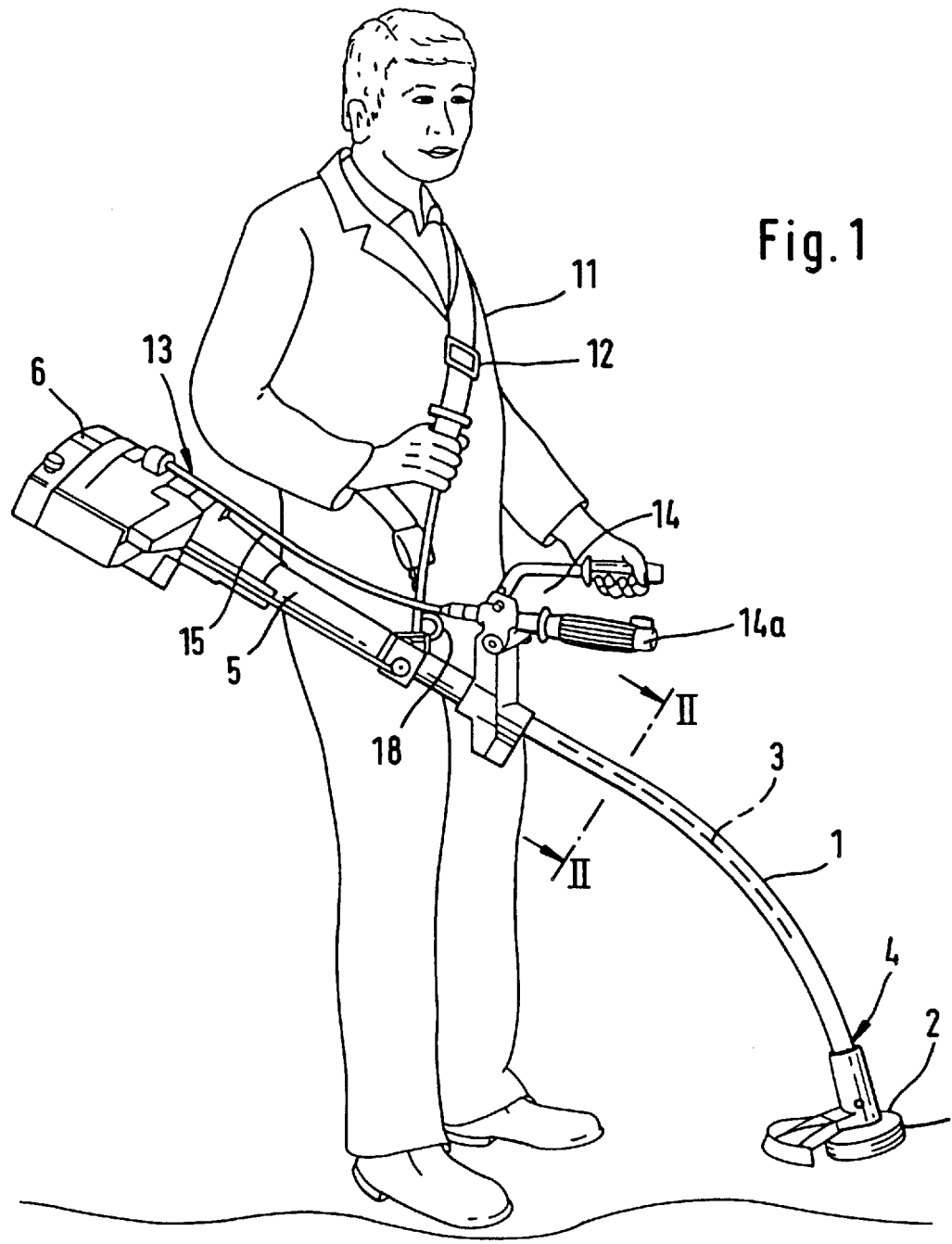
FIG. 1 is a perspective view of a brushcutter held in its operating position with the brushcutter being equipped with a bent protective tube.

The operator 11 shown in FIG. 1 wears a carrier belt 12 over the left shoulder on which a brushcutter 13 is supported. The brushcutter 13 is supported on the carrier belt 12 by an appropriate swivel connection 18. The brushcutter essentially comprises a guide tube which functions as a protective tube 1 surrounding an inner drive shaft 3. A cutterhead 2 is mounted at the lower end 4 of the protective tube 1 and is driven by a drive motor 6 so as to rotate via a drive shaft 3. The drive motor 6 is flange connected to the other end 5 of the protective tube 1.

The protective tube 1 is bent slightly downward toward the ground in order to provide a suitable work position for the operator 11. The operator 11 holds and guides the brushcutter 13 by means of a handle bar 14 which is attached to the protective tube at approximately the middle third thereof.

One of the two handles of the handle bar 14 is configured as an operator handle 14a and is connected to an actuating element of the drive motor 6 via a bowden cable 15. Preferably, the drive motor is a two-stroke engine and the actuating element is the throttle flap of a membrane carburetor which supplies the two-stroke engine with the fuel mixture.

Figure 2:
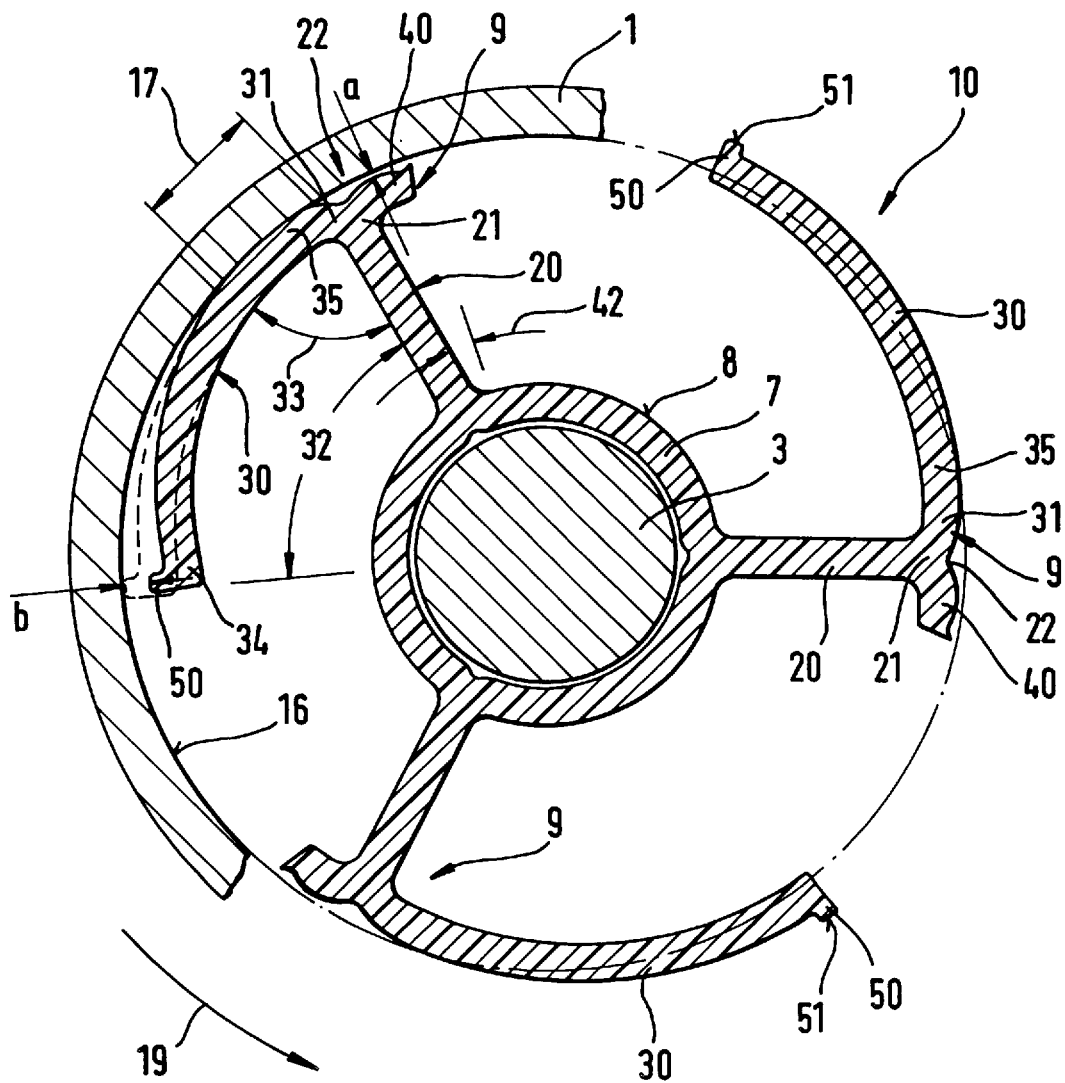
FIG. 2 is an enlarged section view through the guide tube of the brushcutter taken along line II—II of FIG. 1 and shows a first embodiment of the bearing arrangement of the invention.

A bearing structure 10 is shown in FIG. 2 and functions to journal the drive shaft 3 in the protective tube 1 and especially in the bent region thereof. The bearing structure 10 comprises a bearing sleeve 7 which carries support ribs 9 at the outer periphery 8 thereof. With the support ribs 9, the bearing sleeve 7 is held approximately centrally within the protective tube 1.

Each support rib comprises an approximately radially extending radial leg 20 having a free end which extends into a peripheral leg 30. The peripheral leg 30 extends substantially in the peripheral direction 19. As shown in FIG. 2, three radial legs 20 are provided at equidistant spacings to each other over the outer periphery 8 of the bearing sleeve 7. Each of the radial legs 20 has an end 21 facing toward the protective tube 1. A peripheral leg 30 having a connecting segment 31 extends from each of the ends 21. The peripheral leg 30, that is, connecting segment 31 and the radial leg 20 corresponding thereto conjointly define an angle 33 which is approximately 90° or less. The angle is approximately 90° in the embodiment shown in FIG. 2.

The peripheral leg 30 extends in the peripheral direction 19 over a peripheral angle 32 of approximately 60° to 70°, preferably 65°. The radial leg 20 has an end facing away from the peripheral leg 30 and a tail segment 40 extends from the free end 21 as shown. The tail segment 40 extends axially from end 21 lengthwise of the radial leg 20 and in a direction opposite to the peripheral direction 19. The tail segment 40 extends over a peripheral angle 42 of 10° to 15°, preferably 12°. Depending upon the use, the tail segment 40 can be less or can be omitted entirely. In a special embodiment, the tail segment 40 is configured so as to be identical to the peripheral leg 30 so that a peripheral leg 30 lies at both sides of the radial leg 20 and is preferably symmetrical thereto.

The tail segment 40 and the connecting segment 31 of the peripheral leg 30 conjointly define the head 22 of the radial leg 20. The head 22 lies with a narrow spacing (a) to the inner periphery 16 of the protective tube 1.

In the embodiment of FIG. 2, the head 22 of the radial leg 20 lies with a narrow spacing (a) to the inner periphery 16 of the protective tube 1; whereas the peripheral leg 30, which extends in the peripheral direction 19, lies with a foot segment 35 on the inner periphery 16 of the protective tube 1. A lever arm 17 resulting therefrom is very short so that a displacement of the bearing sleeve 7 from the center requires large forces. The bearing sleeve 7 is held essentially stiff in the protective tube 1. The elasticity of the peripheral leg 30, which remains notwithstanding the short lever arm 17, guarantees an adequate damping of the bearing structure 10 against the protective tube 1.

In FIG. 2, a portion of the peripheral wall 1 is shown and the remainder thereof is deleted. FIG. 2 shows that the free end 34 is at a greater spacing (b) to the inner periphery 16 of the protective tube 1. The free end 34 preferably carries a bearing rib 50 facing toward the inner periphery 16. The bearing rib 50 advantageously has a bearing surface 51 adapted to the curvature of the inner periphery 16. The bearing rib 50 can be formed by the bent over free end 34.

As shown in phantom outline in FIG. 2, it can be advantageous that the bearing rib 50 lies against the inner periphery 16 of the protective tube 1. Depending upon the configuration of the peripheral leg 30, the leg 30 therefore lies against the inner periphery 16 of the protective tube 1 with a portion of its length, over its entire length or only at its free end via the bearing rib 50.

Figure 3:
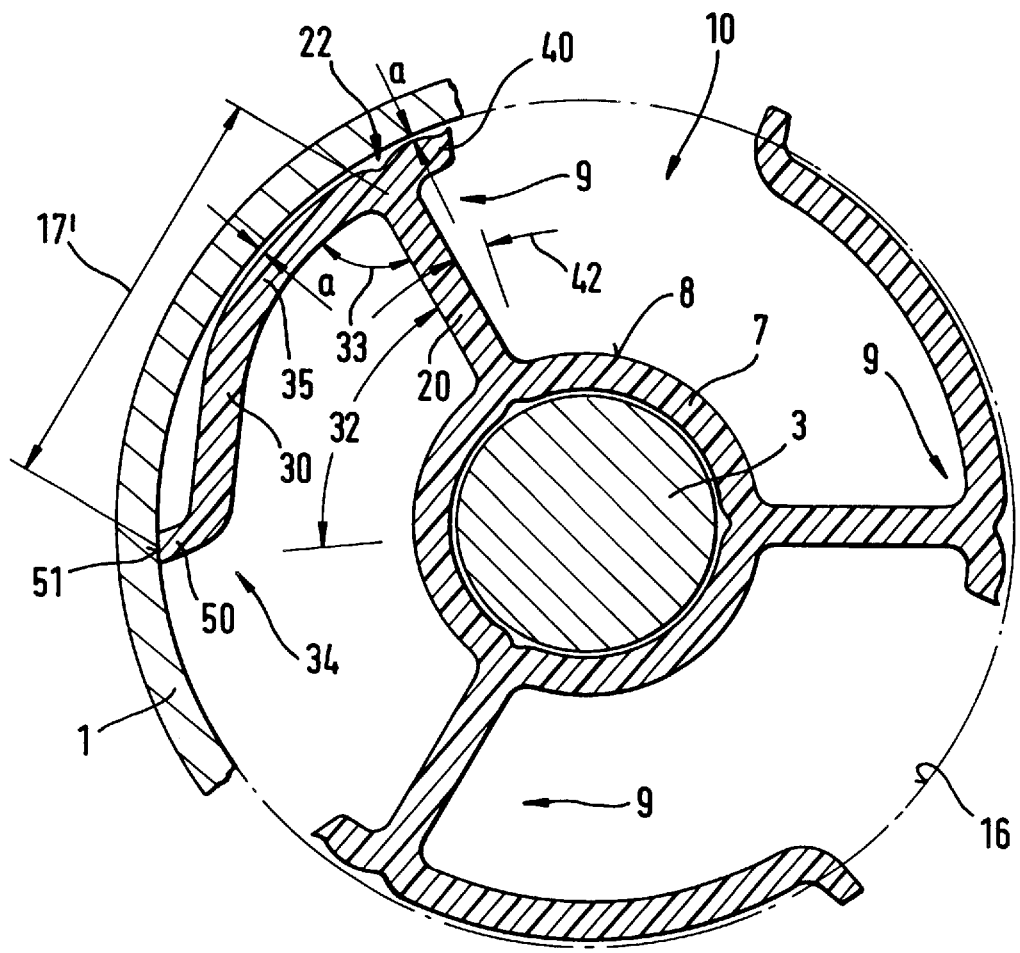
FIG. 3 corresponds to FIG. 2 but shows a bearing arrangement in accordance with another embodiment of the invention; and, FIG. 4 corresponds to FIG. 2 but shows a bearing arrangement according to still another embodiment of the invention.

In the embodiments of FIGS. 2 and 3, the peripheral leg 30 is circularly bent in the peripheral direction 19 and lies (in a stress-relieved condition) preferably approximately parallel to the inner periphery 16. Preferably, the radius of the peripheral leg 30 is greater than the inner radius of the protective tube 1.

In the built-in condition shown in FIG. 2, a foot segment 35 lies against the inner periphery 16 of the protective tube 1 and the peripheral leg 30 is clearly bent back from the inner periphery 16.

In the embodiment of FIG. 3, not only the head 22 of the radial leg lies with a spacing (a) to the inner periphery 16 of the protective tube 1, but also the foot segment 35 has approximately the same narrow spacing (a) to the inner periphery 16 of the protective tube 1. As shown in FIG. 3, the peripheral leg 30 lies, in its built-in position, with its free end 34 on the inner periphery 16. For this purpose, the bearing rib 50 has an adapted bearing surface 51 and the free end 34 is bent over to form the bearing rib 50. In this way, a relatively long lever arm 17' results which provides a softer journalling of the bearing sleeve 7 in the protective tube 1. A built-in bearing structure 10 configured in this manner operates to provide strong damping. The narrow spacing (a) limits the possible displacement of the bearing sleeve 7 from the center.

A further displacement of the bearing sleeve 7 from the center is no longer possible after the head 22 of the radial leg 20 moves against the inner periphery 16 of the protective tube 1. This is so because an elastic deformation is prevented by the precise radial position of the radial leg 20.

Figure 4:
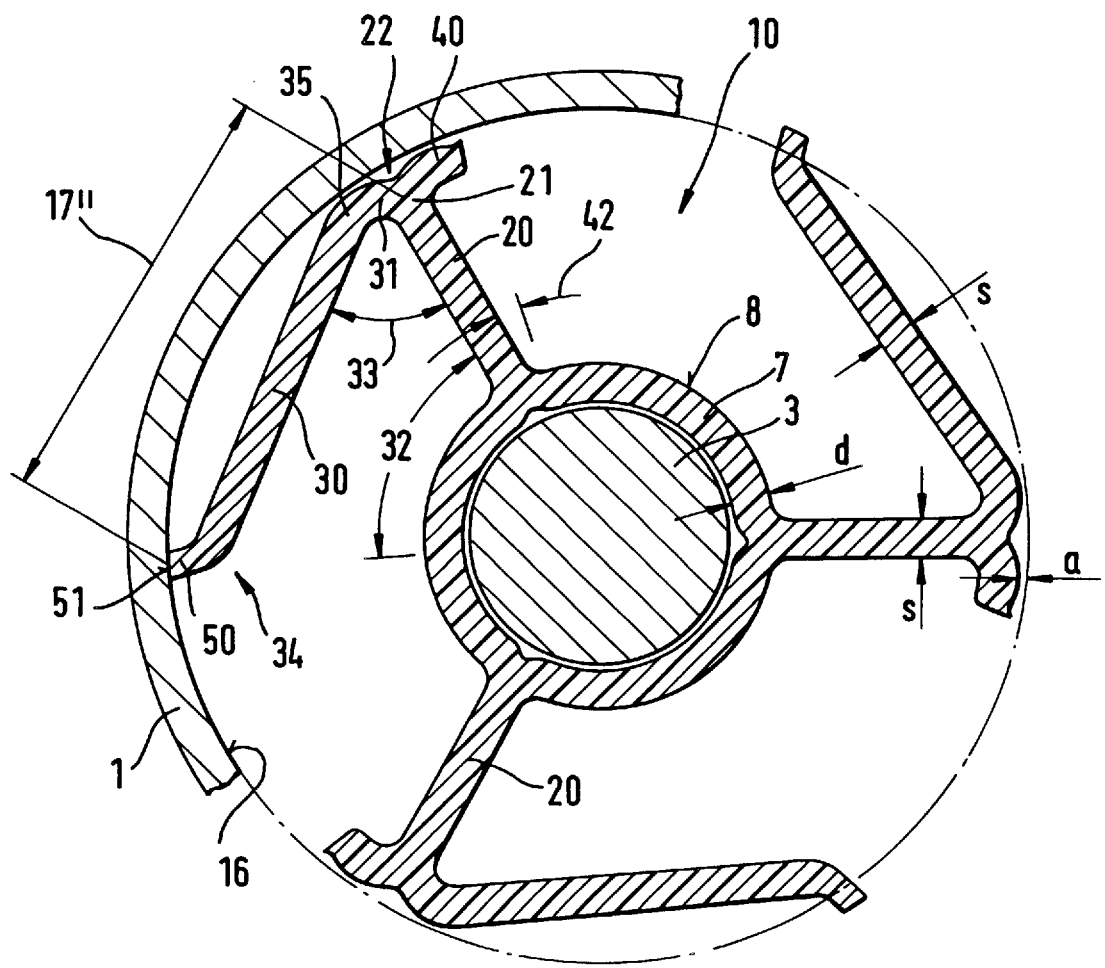

FIG. 4 shows a third embodiment of the bearing structure 10 wherein the peripheral leg 30 is essentially configured to be linear and its free end 34 is bent over in the direction toward the inner periphery 16 of the protective tube 1 to form a bearing rib 50. The bearing rib 50 has a bearing surface 51 adapted to the inner profile 16 and lies against the protective tube 1 whereby a relatively long lever arm 17" results which makes possible a soft journalling of the bearing sleeve 7 and therefore a strong damping action. The head 22 of the radial leg 20 and also the foot segment 35 of the peripheral leg 30 lie at a spacing (a) to the inner periphery 16 of the protective tube 1. If larger displacement forces act on the bearing sleeve 7, then they can be braced by contact engagement of the radial leg 20 on the inner periphery 16 of the protective tube 1 after overcoming the radial spacing (a). In this way, a further displacement of the bearing sleeve 7 is reliably precluded. To obtain the long lever arm 17", the angle 33 between the peripheral leg 30 and the radial leg 20 is selected to be approximately 55°.

In the embodiments of FIGS. 2 to 4, the peripheral leg 30 (either with its foot segment 35 or with its bearing rib 50 configured at its free end 34) lies under elastic pretension against the inner periphery 16 of the protective tube 1.

The bearing structure 10 is configured as one piece made of plastic. The peripheral leg 30 and the radial leg 20 have substantially the same wall thickness (s). The wall thickness (s) corresponds advantageously approximately to the wall thickness (d) of the bearing sleeve 7.

It is understood that the foregoing description is that of the preferred embodiments of the invention and that various changes and modifications may be made thereto without departing from the spirit and scope of the invention as defined in the appended claims.

What is claimed is:

1. A bearing arrangement for a drive shaft connecting a work tool to a drive unit, the arrangement comprising:

a protective tube defining a longitudinal axis and having an inner wall surface extending in a peripheral direction about said longitudinal axis;

a bearing structure mounted in said protective tube and having a bearing sleeve for accommodating said drive shaft therein and said bearing sleeve having an outer periphery;

said bearing structure further including a plurality of longitudinally running supporting ribs extending from said outer periphery to act on said inner wall surface to hold said bearing sleeve approximately centered in said protective tube;

each of said supporting ribs including a radial leg extending approximately radially from said bearing sleeve and a peripheral leg extending axially of said radial leg and approximately in said peripheral direction;

said radial leg having an outer radial end portion facing toward said inner wall surface so as to leave a gap (a) therebetween;

said peripheral leg extending from said radial leg at said outer radial end portion and being supported on said inner wall surface; and, said peripheral leg being joined to said radial leg at an angle of less than 90°.

2. The bearing arrangement of claim 1, said bearing structure further including a tail segment extending from said peripheral leg and projecting beyond said radial leg.

3. The bearing arrangement of claim 2, said peripheral leg having an end segment; and, said end segment and said tail segment conjointly defining said outer radial end portion of said radial leg.

4. The bearing arrangement of claim 3, said peripheral leg having a foot segment extending from said end segment thereof; and, said foot segment being disposed at a very narrow spacing (a) from said inner wall surface of said protective tube.

5. The bearing arrangement of claim 2, said peripheral leg extending over a peripheral angle of approximately 60° to 70° measured in a plane perpendicular to said longitudinal axis.

6. The bearing arrangement of claim 5, said peripheral angle being approximately 65°.

7. The bearing arrangement of claim 2, said tail segment extending over a peripheral angle of approximately 10° to 15° measured in a plane perpendicular to said longitudinal axis.

8. The bearing arrangement of claim 7, said peripheral angle being approximately 12°.

9. The bearing arrangement of claim 1, said peripheral leg being joined to said radial leg at an angle of approximately 55°.

10. The bearing arrangement of claim 1, said peripheral leg having an outer free end and a bearing rib extending from said free end radially toward said inner wall surface.

11. The bearing arrangement of claim 10, said outer free end being an outer segment bent over to define said bearing rib.

12. The bearing arrangement of claim 1, said peripheral leg extending circularly-shaped in said peripheral direction approximately parallel to said inner wall surface of said protective tube.

13. The bearing arrangement of claim 12, said peripheral leg defining a radius measured from said longitudinal axis which is greater than the inner radius of said protective tube.

14. The bearing arrangement of claim 1, said peripheral leg having a foot segment extending into said outer radial end portion of said radial leg and said foot segment being in contact engagement with said inner wall surface of said protective tube.

15. The bearing arrangement of claim 1, said peripheral leg being linear and defining a plane.

16. The bearing arrangement of claim 1, said peripheral leg being in elastic pretensioned contact engagement with said inner wall surface.

17. The bearing arrangement of claim 1, said peripheral leg and said radial leg having approximately the same wall thickness (s).

18. The bearing arrangement of claim 17, said bearing sleeve also having approximately the same wall thickness (s).

* * * * *